United States Patent

Hoshino

[11] Patent Number: 5,222,706
[45] Date of Patent: Jun. 29, 1993

[54] PIPE CONNECTING STRUCTURE FOR PIPE-TYPE MODULAR WIPER APPARATUS

[75] Inventor: Takashi Hoshino, Gunma, Japan

[73] Assignee: Mitsuba Electric Manufacturing Co., Ltd., Gunma, Japan

[21] Appl. No.: 786,821

[22] Filed: Nov. 1, 1991

[30] Foreign Application Priority Data

Nov. 2, 1990 [JP] Japan .................. 2-115570

[51] Int. Cl.$^5$ ............................... F16M 11/00
[52] U.S. Cl. ................... 248/200; 15/250.31; 74/42; 403/388
[58] Field of Search ........... 15/250.31, 250.27, 250.30, 15/250.34; 403/388, 391; 74/42, 51; 296/192; 248/200, 214

[56] References Cited

U.S. PATENT DOCUMENTS

| 1,414,578 | 5/1922 | Oatman | 15/250.31 |
|---|---|---|---|
| 1,747,284 | 2/1930 | Berill | 15/250.27 |
| 2,010,693 | 9/1932 | Hueber et al. | 15/250.31 |
| 2,858,153 | 10/1958 | Petersen | 403/388 |
| 2,867,918 | 1/1959 | Miller | 248/214 |
| 3,046,040 | 7/1962 | Laper | 403/388 |
| 3,429,597 | 2/1969 | Krohm | 15/250.34 |
| 3,851,351 | 12/1974 | Pickles et al. | 15/250.27 X |
| 4,477,293 | 10/1984 | Timmis | 15/250.27 X |
| 4,515,496 | 5/1985 | McKay | 403/388 |
| 4,969,227 | 11/1990 | Reed et al. | 15/250.27 X |

FOREIGN PATENT DOCUMENTS

| 2117342 | 4/1971 | Fed. Rep. of Germany | 15/250.31 |
|---|---|---|---|
| 2056672 | 5/1972 | Fed. Rep. of Germany | 15/250.27 |
| 699958 | 11/1953 | United Kingdom | 15/250.27 |
| 875036 | 8/1961 | United Kingdom | 15/250.30 |

Primary Examiner—Alvin C. Chin-Shue
Assistant Examiner—Korie H. Chan
Attorney, Agent, or Firm—Oliff & Berridge

[57] ABSTRACT

A pipe connecting structure for a pipe-type modular wiper apparatus includes: a first bracket to which a wiper motor is fastened; and a second bracket to which a wiper shaft is fastened and which is, via a pipe member, integrally connected to the first bracket to which a wiper motor is fastened. The pipe member is integrally fastened to the brackets by integrally inserting a pipe nut into an insertion hole formed at a position at which the pipe member is connected to the bracket in such a manner that a bolt is, in a threaded manner, inserted from the bracket side in a state where the bracket is brought into contact with a head portion of the pipe nut projecting over the pipe member. A recess-groove shape fastening groove portion is formed in a portion of the first bracket to be tightened by the bolt, and the pipe fitting groove portion has a depth with which the pipe member can be fitted by a degree larger than the half of the pipe member. Two introduction surfaces of the pipe fitting groove portion through which the pipe member is introduced are made to be parallel surfaces facing a direction of a tangent of the outer circumference of the pipe member.

7 Claims, 3 Drawing Sheets

PIPE CONNECTING STRUCTURE FOR PIPE-TYPE MODULAR WIPER APPARATUS

BACKGROUND OF THE INVENTION

1. Field of the Invention

The present invention relates to a pipe connecting structure for a pipe-type modular wiper apparatus for use in a vehicle such as an automobile, a bus, a truck or the like.

2. Description of the Related Art

There has been available a modular wiper apparatus structured in such a manner that a bracket to which the wiper motor is fastened and another bracket to which the wiper shaft is fastened are connected to each other by a pipe member. In a modular wiper apparatus of the type described above, the pipe member and the bracket are connected to each other in such a manner that a cylindrical projection to be inserted into the inner surface of the pipe member is formed on the bracket and the cylindrical projection is inserted into the pipe member at the end portion of the pipe member before a rivet is inserted into a hole formed at a position which corresponds to the projection and the pipe member so as to be riveted. However, the structure of this type necessarily encounters a problem of generation of a gap which will be formed between the inner surface of the pipe member and the projection of the bracket and that between the rivet, the pipe member and the hole formed in the bracket. Therefore, the wiper apparatus suffers from an undesirable play, causing a problem to take place in that, for example, the range which is wiped by the wiper blade is undesirably changed and/or noise is generated.

A pipe nut is sometimes employed for the purpose of fixing another member to the pipe member. The pipe nut in this case is employed as shown in FIG. 4 in such a manner that: a head portion 15a having the lower surface curved along the outer surfaces of the pipe member and the upper surface formed into a flat shape is formed on the top outer surface portion of a cylindrical member; and a female thread 15c is formed in the lower inner surface of the above-described cylindrical member. In this case, the pipe nut 15 is first inserted into a hole formed on the pipe member 6, and then a tool (omitted from illustration) is used in such a manner that a male thread formed on the tool is engaged with the female thread 15c of the pipe nut 15 so as to tighten them, after this process, the tool is pulled together with the female thread 15c. As a result, the intermediate portion of the pipe nut 15 is deformed into a flange shape so that the pipe nut 15 is fixedly secured to a portion within the hole formed in the pipe member 6 while preventing generation of undesirable play around the hole formed in the pipe member.

It might therefore be feasible to employ a structure using the above-described pipe nut 15 as shown in FIG. 5 in such a manner that the bracket 16 is positioned to contact with the flat surface of the head portion 15a of the pipe nut 15 fastened to the pipe member 6 before a bolt 13 is screwed so that the pipe member 6 and the bracket 16 are connected to each other. The above-described structure encounters no problem when load is applied in the axial direction of the bolt because the load can be received by the bolt. However, strength exhibited is unsatisfactory when a load is applied from a direction deviated from the axial direction of the bolt. Therefore, undesirable play takes place, requiring that the strength be further improved.

SUMMARY OF THE INVENTION

This and other objects of the present invention are to provide a pipe connecting structure for a pipe-type modular wiper apparatus capable of overcoming the above-described problems.

According to one aspect of the present invention, there is provided a pipe connecting structure for a pipe-type modular wiper apparatus comprising: a bracket to which a wiper motor is fastened; and a bracket to which a wiper shaft is rotatably fastened and which is, via a pipe member, integrally connected to the bracket to which a wiper motor is fastened. The pipe member is integrally fastened to the brackets by integrally inserting a pipe nut into an insertion hole formed at a position at which the pipe member is connected to the bracket in such a manner that a bolt is, in a threaded manner, inserted from the bracket side in a state where the bracket is brought into contact with a head portion of the pipe nut projecting over the pipe member. A recess-groove shaped fastening portion is formed in a portion of the bracket to which the pipe member is fastened, and the pipe member is fitted to the fastening groove portion so as to be tightened by the bolt. The groove has a depth with which the pipe member can be fitted by a degree larger than the half of the pipe member's diameter and two introduction surfaces of the fastening portion through which the pipe member is introduced are made to be parallel surfaces facing a direction of a tangent of the outer circumferences of the pipe member.

Other and further objects, features and advantages of the invention will appear more fully from the following description.

BRIEF DESCRIPTION OF THE DRAWINGS

Accompanying drawings illustrate embodiments of the present invention of a pipe connecting structure for a pipe-type modular wiper apparatus according to the present invention, where.

DETAILED DESCRIPTION OF PREFERRED EMBODIMENTS

Figure 1:
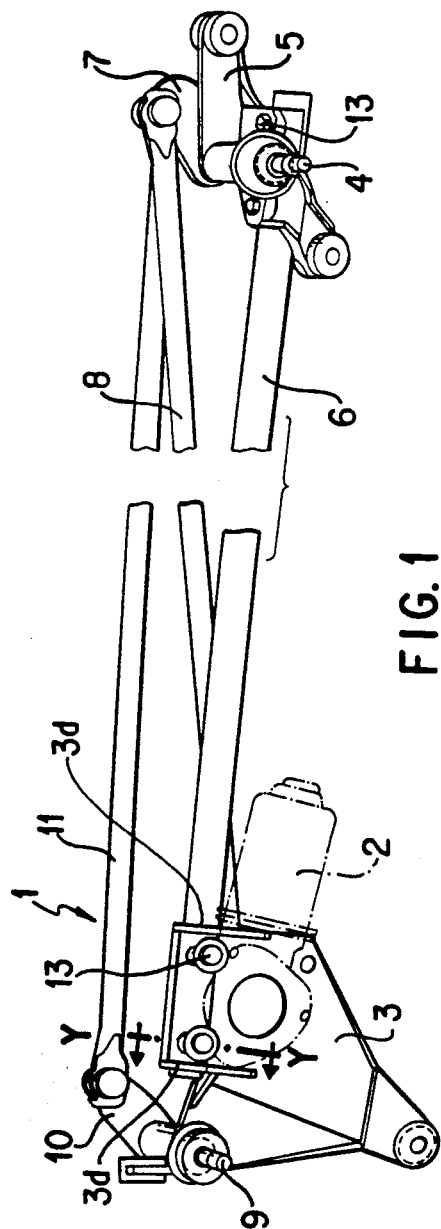
FIG. 1 is a perspective view which illustrates a wiper apparatus.

An embodiment of the present invention will now be described with reference to the drawings. Referring to the drawings, a pipe-type modular wiper apparatus 1 is constituted by integrally connecting an aluminum die-cast first bracket 3 and an aluminum die-cast second bracket 5 to each other by using a steel pipe member 6. A wiper motor 2 is attached to the aluminum die-cast first bracket 3, while a wiper shaft 4 is rotatably attached to the aluminum die-cast second bracket 5. Furthermore, a wiper link 8 is interposed between a motor arm (omitted from illustration) provided for the motor shaft of the wiper motor 2 and a link arm 7 provided on the wiper shaft 4. In addition, another wiper link 11 is interposed between the link arm 7 and a link arm 10 of a wiper shaft 9 provided for the first bracket 3. As a result of this, when the wiper motor 2 is rotated, the two link arms 7 and 10 are reciprocated, causing the wiper shafts 4 and 9 to be rotated. Therefore, the surface of the window can be wiped as desired.

The pipe member 6 for integrally connecting the above-described two brackets 3 and 5 to each other is, by tightening, connected to each of the brackets 3 and 5 by using pipe nuts 15. The pipe member 6 is connected to the first bracket 3 by virtue of the connecting structure according to the present invention which is arranged as follows:

That is, the first bracket 3 has a pipe fitting groove 3c which is formed into a semicircular arc in such a manner that a lower portion faces downward and the upper portion is a bottom groove, the pipe member 6 is fitted to the pipe fitting groove 3c. Two cylindrical, nut fitting grooves 3a are arranged on the bottom groove portion of the pipe fitting groove 3c in the longitudinal direction, so as to constitute two pipe member connecting portions in the axial direction of the pipe fitting groove 3c. The fastening groove portion thus comprises the pipe fitting groove 3c and the nut fitting groove 3a. The above-described fastening groove portions are structured in such a manner that they further deeply fit over the radius position of pipe member 6, which is arranged to be fitted within the above-described pipe fitting groove 3c. In addition, both ends of the pipe member 6 remain open, as when cut. Therefore, water in the pipe member 6 is allowed to drain from the pipe member ends. Furthermore, the two introducing surfaces 3b, 3b of the pipe fitting groove 3c, through which the pipe member 6 is inserted, are structured in such a manner that they open substantially parallel to each other in the direction of tangent K of the outer circumference of the pipe 6. And a pare of ribs 3d, 3d are formed on the upper surface of the first bracket 3, especially on the upper surface of the pipe fitting groove 3c, the ribs 3d, 3d contribute to the increase in strength of the bracket 3.

Figure 2:
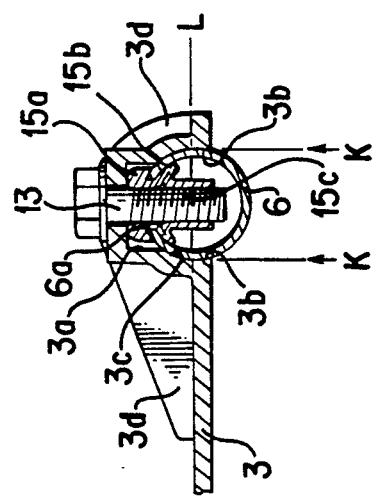
FIG. 2 is a cross sectional view taken along line Y—Y of FIG. 1.
Figure 3A:
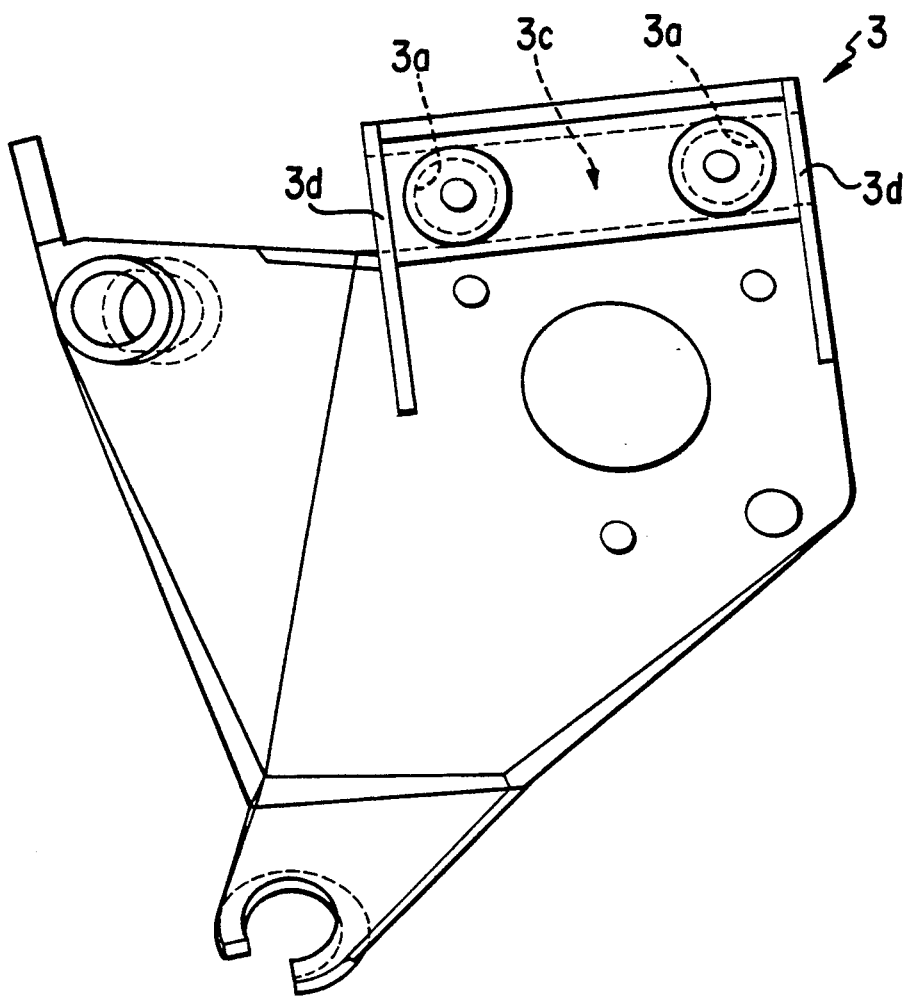
FIGS. 3A, 3B and 3C are, respectively, a plan view, a side elevational view and a front elevational view of a wiper bracket.
Figure 3B:
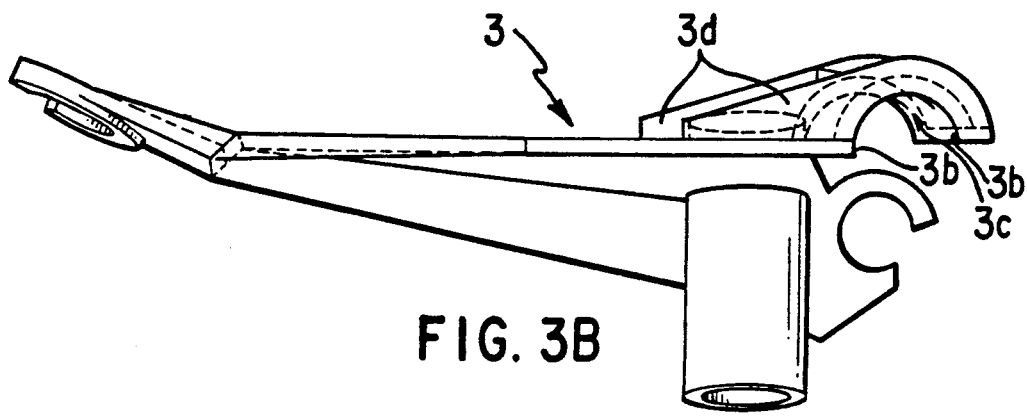
Figure 3C:
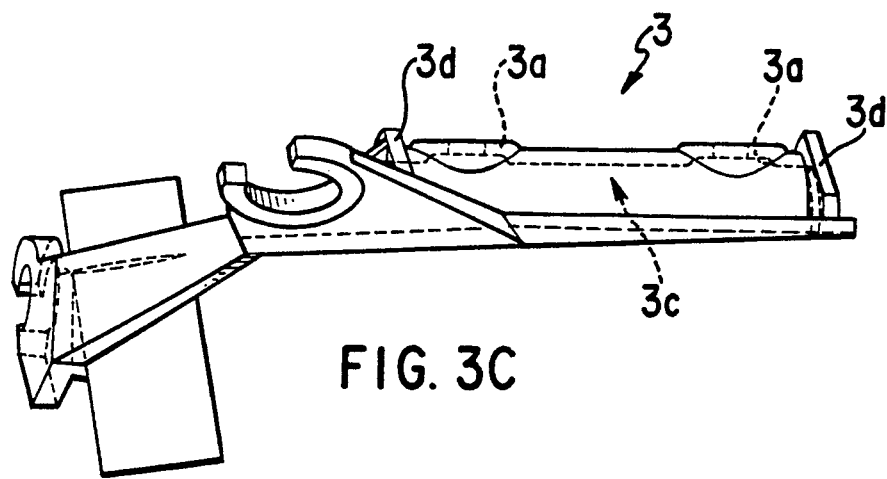
Figure 4:
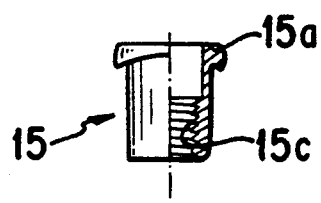
FIG. 4 is a partial front elevational cross-sectional view which illustrates a pipe nut.
Figure 5:
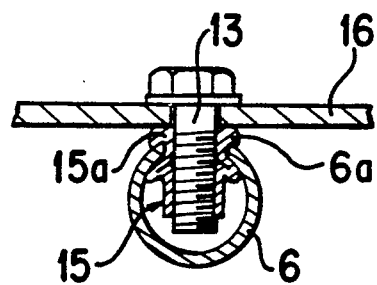
FIG. 5 is a cross-sectional view which illustrates an essential portion of a conventional structure.

On the other hand, a first bracket connecting portion of the pipe member 6 has an insertion hole 6a at a position confronting the bottom portion of the nut fitting groove 3a. A leading portion of the pipe nut 15 is inserted into the above-described insertion hole 6a, while a tool is used to deform an insertion intermediate portion 15b (FIG. 2) so that it is folded back and bent to form a flange shape along the inner surface of the pipe member 6. As a result, the pipe member 6 is held by the above-described insertion intermediate portion 15b and a head portion 15a of the pipe nut 15 so that the steel pipe nut 15 is integrally secured to the pipe member 6 in such a manner that the separation of the steel pipe nut 15 and the pipe member 6 is prevented. In this case, the intermediate portion 15b is received and supported by the inner surface of the pipe fitting groove 3c through the pipe member 6, therefore the pipe member 6 is not deformed when the bolt is tightened, and the pipe member 6 is fixedly connected. Furthermore, the insertion intermediate portion 15b is arranged to cover the insertion hole 6a in the condition that the insertion intermediate portion 15b is forcibly inserted into the edge of the insertion hole 6a and the undersurface of the pipe member 6 at the perimeter of the insertion hole 6a. Accordingly, the pipe member 6 is fixedly connected in the axial direction as well as the vertical direction of the pipe nut 15. Then, the intermediate portion 15b is directly received and supported by the pipe fitting groove portion of the bracket 3 while holding the pipe member 6. As described above, the pipe member 6, integrally including the pipe nut 15, is fitted within the nut fitting groove 3a in such a manner the head portion 15a projecting over the outer surface of the pipe member 6 is abutted against the bottom portion of the nut fitting groove 3a. Furthermore, a bolt 13 is driven into the thread portion 15c of the pipe nut 15. Therefore, the pipe member 6 and the first bracket 3 are fixedly connected to each other.

When the pipe member 6 is connected to the first bracket 3 in the above-described structure according to the present invention, the pipe member 6 is fitted within the pipe fitting groove 3c in a state where the pipe nut 15 has already been inserted into the pipe member 6. Then, the bolt 13 is driven from the bracket side of the nut fitting groove 3a so that the above-described connection is completed. Because the pipe member 6 thus-connected is deeply received in the pipe fitting groove 3c in such a manner that the portion of the pipe member 6 exceeding its radius position is received, a load given in the direction of the plate of the first bracket 3 and as well as load given in the axial direction of the bolt 13 can be effectively received by the first bracket 3. Therefore, separation of the pipe member 6 from the pipe fitting groove 3c can be prevented while maintaining satisfactory strength of the connection.

According to the present invention, the pipe member 6 is deeply held by the pipe fitting groove 3c of the fastening groove portion in such a manner that the two introduction surfaces 3b of the pipe fitting groove 3c are arranged to form parallel surfaces facing the direction of tangent K of the outer circumference of the pipe member 6. Therefore, the undesirable undercut state of the fastening groove portion including the fitting groove 3c generated in the mold removal direction can be prevented at the time of molding the first bracket 3. As a result, an effect can be obtained in that the ordinary molding operation can be performed.

As described above, the structure according to the present invention is arranged in such a manner that: the pipe nut 15 included in the pipe member 6 is employed; and the insertion intermediate portion 15b of the pipe member 6 is deformed to form a flange like spacing along the inner surface of the pipe member 6 so that the pipe member 6 is held fixedly by the pipe nut 15. As a result, the leading portion of the bolt and the nut which is screwed by the bolt are not exposed from the bracket 3. Furthermore, no load acts in a direction in which the pipe member 6 is deformed in its radial direction. Therefore, an effect can be obtained in that the strength of the pipe member 6 can substantially be maintained and thereby satisfactory strength can be realized.

Furthermore, the structure according to the above-described embodiment is arranged in such a manner that the position at which the pipe member 6 is fitted within the fastening groove portion and abutted and supported by the two introduction surfaces 3b, 3b of the pipe fitting groove 3c substantially aligns with the inner surface of the bracket (that is, the longitudinal line L of the pipe member 6 in the direction of the plate substantially aligns to the side surface of the plate of the bracket). Therefore, a load given in the direction of the plate surface is directly received by the plate surface of the bracket. Therefore, an effect can be obtained in that strength can be further improved.

In addition, since the pipe fitting groove 3c, according to this invention, is oriented open-face downward, the water entered therein drops down. Accordingly, the water is not retained in the pipe fitting groove 3c. Since both ends of the pipe member 6 remain open as when cut, water in the pipe member 6 is allowed to drain from the pipe member ends. Accordingly, water in the pipe member 6 is not retained in the pipe member 6. As a result, the pipe member and the bracket do not rust or corrode.

In this embodiment, the invention can of course be applied to the connection portion between the first bracket 3 and the pipe member 6 as well as the connection portion between the second bracket 5 and the pipe member 6.

Since the present invention is structured as described above, the pipe member is connected to the bracket in such a manner that the pipe member is fitted within the fastening groove portion of the bracket in a state where the pipe nut has been inserted and fitted to the pipe member. Then, the bolt is driven from the bracket side. Therefore, the pipe member is held by the fastening groove portion (fitting groove 3c) such that a portion of the pipe member larger than half the pipe member's cross-section is held. As a result, a load given to the pipe member in the axial direction of the bolt can, of course, be effectively received as well as a load given in the direction of the plate surface, perpendicular to the above-described direction, can be effectively received by the plate surface of the bracket. Therefore, the strength of connection established between the pipe member and the bracket can be significantly improved without a necessity of providing an independent reinforcing means because the characteristics of the bracket are directly effectively utilized, the characteristics being that a bracket is strong in the direction of its plate surface. Therefore, the strength of the established connection can assuredly be improved by a simple structure while eliminating a necessity for increasing the overall weight.

Furthermore, the pipe member is deeply received by the fastening groove portion by a large portion exceeding half the cross-section of the pipe member. In this state, the two introduction surfaces of the fastening groove portion for receiving the pipe member are formed into parallel surfaces facing the direction of the tangent of the outer circumferences of the pipe member as an alternative to the conventional circular arc shape which is formed along the outer surface of the pipe member to be fastened. As a result, the pipe member can be easily inserted, and the undesirable undercut state of the fastening groove portion, in the mold removable direction, is prevented. Therefore, an effect can be obtained in that the bracket can be easily molded because it can be molded by ordinary molding methods.

Although the invention has been described in its preferred form with a certain degree of particularly, it is understood that the present disclosure of the preferred form can be changed in the details of construction and the combination and arrangement of parts may be varied without departing from the spirit and the scope of the invention as claimed.

What is claimed is:

1. A pipe connecting structure for a pipetype modular wiper apparatus comprising:
   a first bracket;
   a second bracket;
   a pipe member;
   at least one connecting means for connecting the pipe member to at least one of the first and second brackets, each connecting means comprising a pipe nut, having a head portion, and a bolt, the bolt of each connecting means tightening the head portion of the corresponding pipe nut against the corresponding one of the first and second brackets to locate the corresponding one of the first and second brackets between the corresponding bolt and head portion; and
   the at least one of the first and second brackets including a fastening groove portion for receiving the pipe member within the at least one of the first and second brackets, the fastening groove portion having a depth larger than a radius of the pipe member.

2. The pipe connecting structure of claim 1, wherein said fastening groove portion of each said one of the first and second brackets further comprises a semicircular, arc-shaped pipe fitting groove for fastening said pipe member to said fastening groove portion, and at least one cylindrical nut fitting groove for fitting the head portion.

3. The pipe connecting structure of claim 2, wherein the depth at which said pipe member is fitted into said pipe fitting groove is sufficient to fit said pipe member by a degree larger than half a cross-sectional area of said pipe member.

4. The pipe connecting structure of claim 2, wherein said fastening groove portion further comprises two introduction surfaces through which said pipe member is introduced into said pipe fitting groove, said introduction surfaces being parallel surfaces facing in a direction of a tangent of an outer circumference of said pipe member.

5. The pipe connecting structure of claim 2, wherein each said pipe nut has an intermediate portion, the intermediate portion receiving a threaded portion of the corresponding bolt, said intermediate portion being inserted into said pipe member and folded back along the inner surface of said pipe member so as to be tightened against said pipe member when the corresponding bolt tightens the corresponding one of the first and second brackets against the pipe member.

6. The pipe connecting structure of claim 2, wherein a lower portion of said pipe fitting groove is open and an upper portion of said pipe fitting groove forms the nut fitting groove in a longitudinal direction of said pipe fitting groove.

7. The pipe connecting structure of claim 2, said pipe member having at least one open end.

* * * * *